(12) United States Patent
Qu et al.

(10) Patent No.: US 11,237,450 B2
(45) Date of Patent: Feb. 1, 2022

(54) DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Lianjie Qu, Beijing (CN); Kang Guo, Beijing (CN); Yonglian Qi, Beijing (CN); Hebin Zhao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 49 days.

(21) Appl. No.: 16/394,456

(22) Filed: Apr. 25, 2019

(65) Prior Publication Data

US 2020/0041862 A1    Feb. 6, 2020
US 2020/0409226 A9    Dec. 31, 2020

(30) Foreign Application Priority Data

Aug. 1, 2018   (CN) .......................... 201810862502.3

(51) Int. Cl.
    *G02F 1/167*     (2019.01)
    *G02F 1/1335*     (2006.01)
    *G02F 1/1343*     (2006.01)

(52) U.S. Cl.
    CPC .......... *G02F 1/167* (2013.01); *G02F 1/13439* (2013.01); *G02F 1/133504* (2013.01); *G02F 1/134309* (2013.01)

(58) Field of Classification Search
    CPC ............... G02F 1/167; G02F 1/133504; G02F 1/134309; G02F 1/13439
    USPC ........................................................ 345/107
    See application file for complete search history.

(56) References Cited

U.S. PATENT DOCUMENTS

| | | | |
|---|---|---|---|
| 5,046,827 A | 9/1991 | Frost et al. | |
| 5,682,265 A | 10/1997 | Farn et al. | |
| 8,068,089 B2 * | 11/2011 | Matsuda | G02F 1/167 |
| | | | 345/107 |

(Continued)

FOREIGN PATENT DOCUMENTS

| | | |
|---|---|---|
| CN | 101276009 A | 10/2008 |
| CN | 103365021 A | 10/2013 |

(Continued)

OTHER PUBLICATIONS

China First Office Action, Application No. 201810862502.3, dated Dec. 3, 2020, 11 pps.: with English translation.

(Continued)

*Primary Examiner* — Chanh D Nguyen
*Assistant Examiner* — Ngan T. Pham-Lu
(74) *Attorney, Agent, or Firm* — Armstrong Teasdale LLP

(57) ABSTRACT

The present disclosure relates to a display panel. The display panel includes a light switching layer, and a color film layer located on the light switching layer, wherein the color film layer includes a diffraction grating. The color film layer further includes a collimating layer located on a side of the diffraction grating facing away from the light switching layer. The color film layer further includes a light splitting layer located between the diffraction grating and the light switching layer.

10 Claims, 5 Drawing Sheets

(56) References Cited

U.S. PATENT DOCUMENTS

| | | | |
|---|---|---|---|
| 2013/0257708 A1* | 10/2013 | Wang | G02F 1/167 |
| | | | 345/107 |
| 2016/0170264 A1* | 6/2016 | Qin | G02F 1/133603 |
| | | | 362/97.1 |
| 2019/0011628 A1* | 1/2019 | Lee | G02B 6/0091 |
| 2019/0036083 A1* | 1/2019 | Kim | H01L 51/5268 |
| 2019/0179208 A1* | 6/2019 | Sato | G02B 5/003 |
| 2019/0187533 A1* | 6/2019 | Anseth | G02F 1/0126 |

FOREIGN PATENT DOCUMENTS

| | | | |
|---|---|---|---|
| CN | 105974645 A | 9/2016 |
| CN | 106200107 A | 12/2016 |
| CN | 106547144 A | 3/2017 |

OTHER PUBLICATIONS

China Second Office Action, Application No. 201810862502.3, dated Jul. 16, 2021, 14 pps. with English translation.

* cited by examiner

DISPLAY PANEL

CROSS REFERENCE TO RELATED APPLICATIONS

This patent application claims the benefit and priority of Chinese Patent Application No. 201810862502.3 filed on Aug. 1, 2018, the disclosure of which is incorporated by reference herein in its entirety as part of the present application.

BACKGROUND

Embodiments of the present disclosure relate to a field of display technologies, and in particular, to a display panel.

Outdoor advertising and e-readers or the like require the corresponding display products to have the feature of low power consumption. Most e-book readers use an electrophoresis display (EPD) as a display panel. Electrophoresis displays are superior to other types of displays in terms of lightness and whiteness, but can only be used for black and white displays.

BRIEF DESCRIPTION

Embodiments of the present disclosure provide a display panel.

An aspect of the present disclosure provides a display panel. The display panel includes a light switching layer, and a color film layer located on the light switching layer. The color film layer includes a diffraction grating.

In an embodiment of the present disclosure, the color film layer further includes a collimating layer located on a side of the diffraction grating facing away from the light switching layer.

In an embodiment of the present disclosure, the color film layer further includes a light splitting layer located between the diffraction grating and the light switching layer.

In an embodiment of the present disclosure, the light switching layer includes a particle switch, a MEMS switch, or a liquid crystal window.

In an embodiment of the present disclosure, the particle switch includes a first electrode, and a plurality of second electrodes and black charged particles located on a side of the first electrode facing away from the color film layer. The second electrode is perpendicular to the first electrode.

In an embodiment of the present disclosure, the first electrode continuously covers an entire surface of the color film layer.

In an embodiment of the present disclosure, the display panel further includes a scattering layer. The scattering layer is located between the light switching layer and the color film layer or located on a side of the light switching layer facing away from the color film layer.

In an embodiment of the present disclosure, the collimating layer includes a prism structure or a columnar structure.

In an embodiment of the present disclosure, a thickness of the light splitting layer is equal to a light splitting distance.

In an embodiment of the present disclosure, a material of the second electrode includes a reflective conductive material.

In an embodiment of the present disclosure, the second electrode includes a light shielding material and a conductive material located on the light shielding material.

In an embodiment of the present disclosure, the scattering layer includes a base layer and scattering particles or micropores dispersed in the base layer.

Adaptive and further aspects and scope will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present application.

Corresponding reference numerals indicate corresponding parts or features throughout the several views of the drawings.

DETAILED DESCRIPTION

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

Additionally, further to be noted, when the elements and the embodiments thereof of the present disclosure are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation.

The flow diagrams depicted herein are just one example. There may be many variations to this diagram or the steps (or operations) described therein without departing from the spirit of the disclosure. For instance, the steps may be performed in a differing order or steps may be added, deleted, or modified. All of these variations are considered a part of the claimed disclosure.

Example embodiments will now be described more fully with reference to the accompanying drawings.

The current electronic paper is mainly black and white electronic paper. Although many manufacturers are studying color electronic paper, the color effect of color electronic paper is very poor. In addition, existing LCDs and OLEDs utilizing LED backlight or self-illumination consume a lot of energy.

Based on the above problems, the present disclosure can realize low power consumption and realize a color display by using a diffraction grating as a light source in combination with a switching element.

Embodiments of the present disclosure provide a display panel capable of directly using external ambient light as a light source, thereby reducing power consumption of the backlight, improving light efficiency, and realizing color display.

Figure 1:
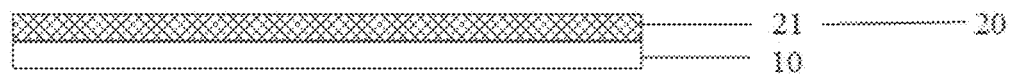
FIG. 1 is a schematic view of a cross section of a display panel in accordance with an embodiment of the present disclosure.

FIG. 1 is a schematic view of a cross section of a display panel in accordance with an embodiment of the present disclosure. As shown in FIG. 1, the display panel 100 includes a light switching layer 10, and a color film layer 20 located on the light switching layer 10. In an embodiment of the present disclosure, the color film layer 20 includes a diffraction grating 21.

Figure 2:
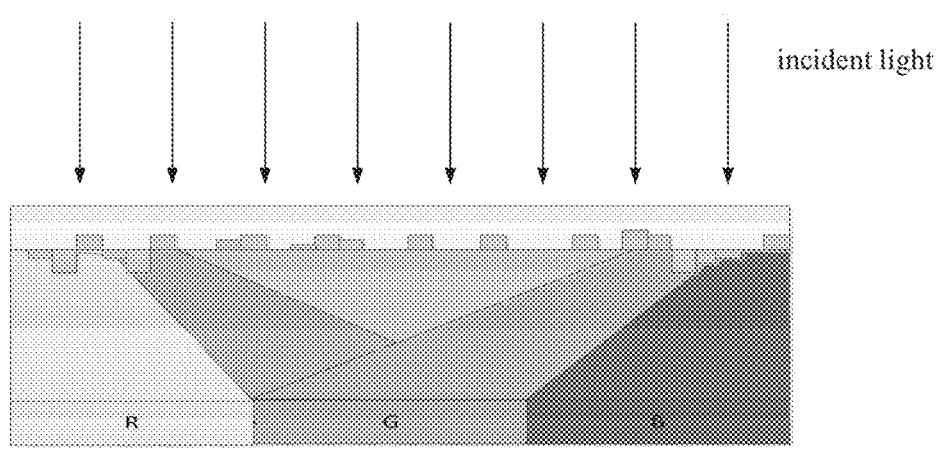
FIG. 2 is a schematic view of the principle of a diffraction grating in accordance with an embodiment of the present disclosure.

FIG. 2 is a view of the principle of a diffraction grating. The diffraction grating belongs to a phase-type diffractive optical element, the operating principle of which is similar to an echelle grating or a blazed grating. That is, the incident light is modulated by changing the parameters (for example, the number of steps, the grating period, etc.) of the diffraction grating to change the phase difference, thereby achieving spectral separation. Specifically, according to the grating equation, $d \sin \theta = m\lambda$ (where d is the grating constant, θ is the diffraction angle, m is the diffraction order, and λ is the wavelength of the incident light), when the diffraction order m is non-zero, different wavelengths λ correspond to different diffraction angles θ, so that it is possible to selectively transmit light having different wavelengths, for example, red light R, green light G, or blue light B. The light transmittance of the diffraction grating is three times that of the conventional color film. Further, regarding the method for fabricating the diffraction grating, for example, a mask may be used to expose the photoresist, thereby forming a diffraction grating structure.

Figure 3:
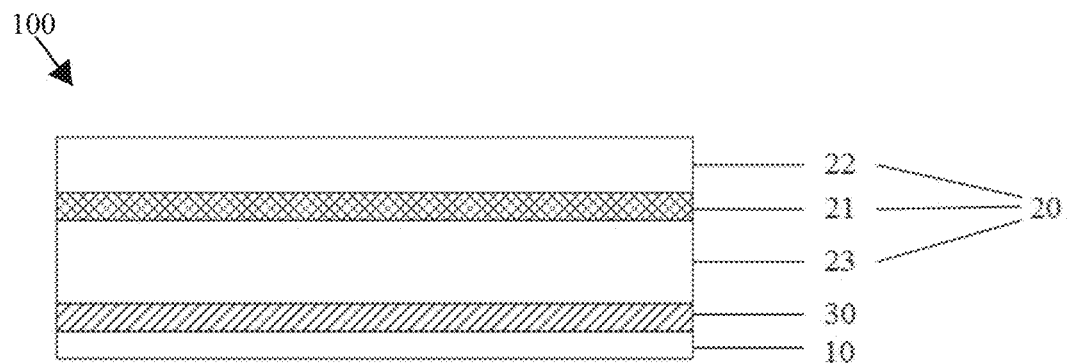
FIG. 3 is a schematic view of a cross section of a display panel in accordance with an embodiment of the present disclosure.

In an embodiment of the present disclosure, as shown in FIG. 3, the color film layer 20 further includes a collimating layer 22 located on a side of the diffraction grating 21 facing away from the light switching layer 10.

It should be noted that, when an external light is incident on the display panel 100, the incident angle of the external light may be modulated by the collimating layer 22 to obtain a collimated light, thereby avoiding color degradation caused by the non-collimated light.

Figure 4:
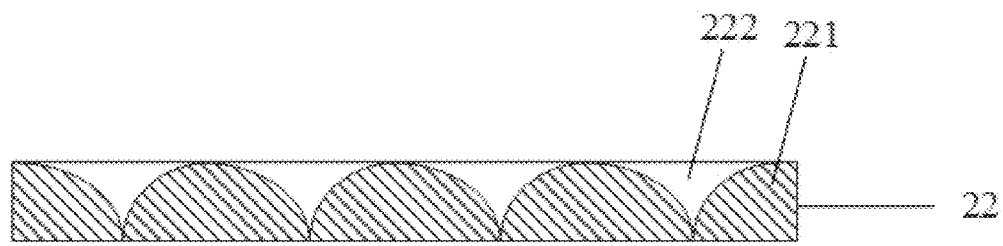
FIG. 4 is a schematic view of a cross section of a structure of a collimating layer in accordance with an embodiment of the present disclosure.

In an embodiment of the present disclosure, as an example, as shown in FIG. 4, the collimating layer 22 may include a prism structure 22. The prism structure 22 includes a base layer 221 and a filling structure 222. In an exemplary embodiment of the present disclosure, the refractive index of the base layer 221 is greater than the refractive index of the filling structure 222.

Figure 5A:
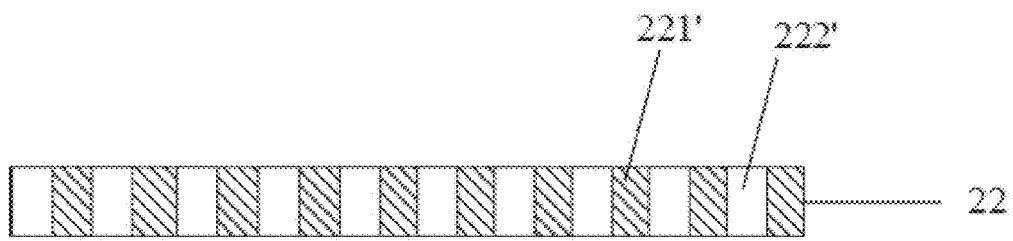
FIGS. 5A and 5B are a schematic view of a cross section and a top view of a structure of a collimating layer in accordance with an embodiment of the present disclosure.
Figure 5B:
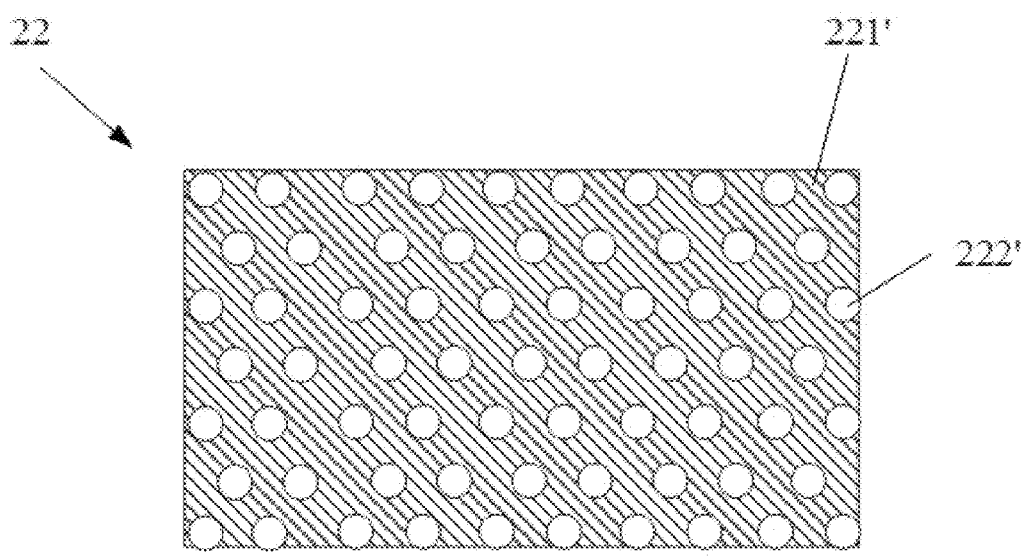

As another example, as shown in FIGS. 5A and 5B, the collimating layer 22 may include a columnar structure 22. The columnar structure 22 includes a base layer 221' and a filling structure 222'. In an exemplary embodiment of the present disclosure, the refractive index of the filling structure 222' is greater than the refractive index of the base layer 221'.

In an embodiment of the present disclosure, as shown in FIG. 3, the color film layer 20 further includes a light splitting layer 23 located between the diffraction grating 21 and the light switching layer 10. The light transmitted through the diffraction grating 21 may be completely separated after passing through the light splitting layer 23, so as to obtain separate monochromatic lights such as red light, green light, and blue light.

In an embodiment of the present disclosure, the thickness of the light splitting layer 23 is equal to the light splitting distance, so that red, green, and blue light may be completely separated to achieve color display. As an example, the light splitting layer 23 may be a resin or any other suitable transparent material.

In an embodiment of the present disclosure, as shown in FIG. 3, the display panel 100 further includes a scattering layer 30 so as to scatter the diffracted light having directions, thereby enlarging the viewing angle.

Figure 6:
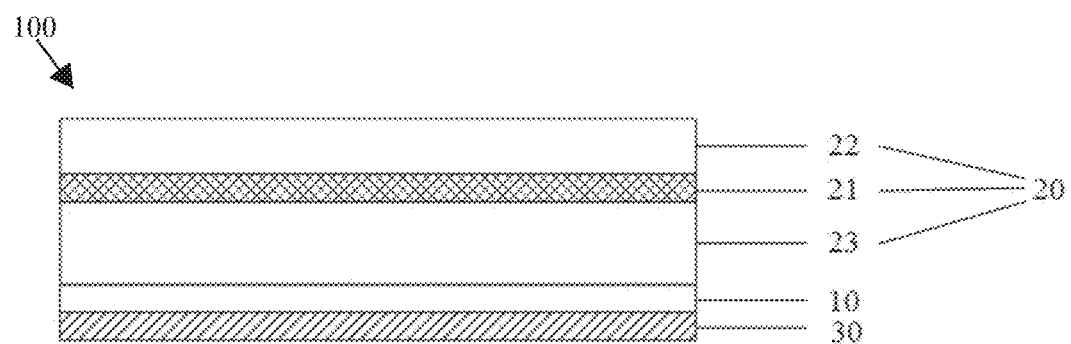
FIG. 6 is a schematic view of a cross section of a display panel in accordance with an embodiment of the present disclosure.

As an example, as shown in FIG. 3, the scattering layer 30 is located between the light switching layer 10 and the color film layer 20. As another example, as shown in FIG. 6, the scattering layer 30 may be located on a side of the light switching layer 10 facing away from the color film layer 20, thereby preventing color crossing caused by prematurely scattering, and thus facilitating the improvement of light efficiency.

In an exemplary embodiment of the present disclosure, the scattering layer 30 may include, for example, a base layer and scattering particles or micropores dispersed in the base layer. In an embodiment of the present disclosure, the above micropores may be formed by ablating the base layer using a laser.

In an embodiment of the present disclosure, the light switching layer 10 includes a particle switch, a MEMS (Micro Electro Mechanical Systems) switch, or a liquid crystal window.

Figure 7:
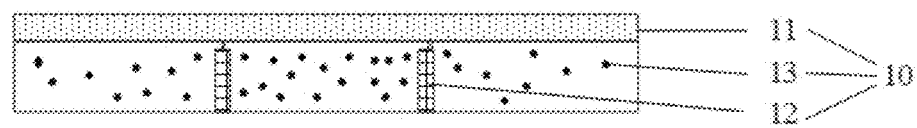
FIG. 7 is a schematic view of a cross section of a particle switch in accordance with an embodiment of the present disclosure.

FIG. 7 schematically shows a view of a cross section of a particle switch in accordance with an embodiment of the present disclosure. As shown in FIG. 7, the light switching layer 10 is a particle switch 10. The particle switch 10 includes a first electrode 11, and a plurality of second electrodes 12 and black charged particles 13 located on a side of the first electrode 11 facing away from the color film layer 20. The second electrode 12 is perpendicular to the first electrode 11. It will be appreciated that, the black charged particles 13 may be disposed within a fluid medium such as a liquid, thereby being driven to move under an electric field. Moreover, it will be appreciated that, the particle switch may also include a switching device (not shown) to apply a voltage to the first and second electrodes.

Figure 8:
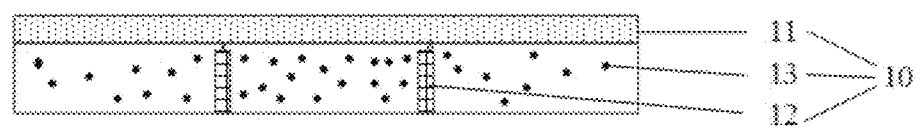
FIG. 8 is a schematic view of a cross section of a particle switch when performing a dark state display in accordance with an embodiment of the present disclosure.
Figure 9:
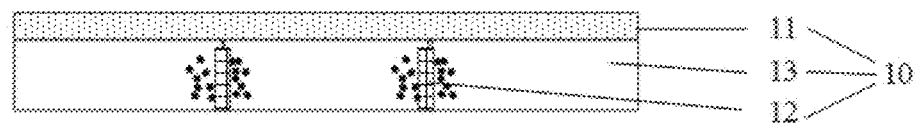
FIG. 9 is a schematic view of a cross section of a particle switch when performing a bright state display in accordance with an embodiment of the present disclosure.

It should be noted that, when the display panel is used for the dark state display, as shown in FIG. 8, if a first voltage is applied between the first electrode 11 and the second electrode, the black charged particles 13 are driven under the electric field and gathered near the first electrode 11. At this time, the particle switch 10 is in a turn-off state, thereby blocking the transmission of light, and thus realizing the dark state display. When the display panel is used for the bright state display, as shown in FIG. 9, if a second voltage having a polarity opposite to the first voltage may be applied between the first electrode 11 and the second electrode 12, the black charged particles 13 are driven under the electric field and gathered near the second electrode 12. At this time, the particle switch 10 is in a turn-on state, thereby allowing the transmission of light, and thus realizing the bright state display, and in turn enabling the color display.

In an exemplary embodiment of the present disclosure, the first electrode 11 continuously covers the entire surface of the color film layer 20, so that the speed of switching to the dark state display may be increased.

In an embodiment of the present disclosure, the first electrode 11 may be transparent.

Figure 10:
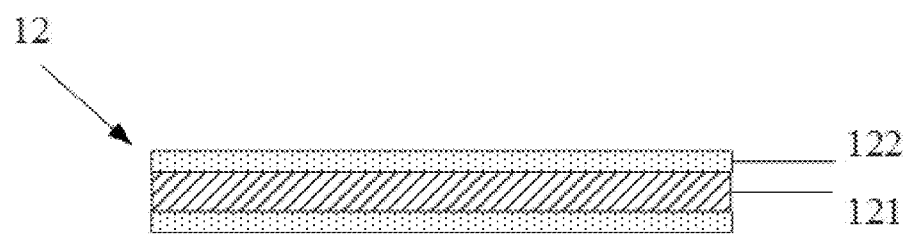
FIG. 10 is a schematic view of a cross section of a structure of a second electrode in accordance with an embodiment of the present disclosure.

According to an embodiment of the present disclosure, the second electrode may have a property of preventing light transmitting, thereby the color crossing caused by the monochromatic light obtained after passing through the light splitting layer being incident on the adjacent pixels may be prevented. As an example, the second electrode may have a reflection characteristic. For example, the material of the second electrode 12 may include a reflective conductive material, such as a reflective metal. As another example, the second electrode 12 may have a light absorption characteristic. For example, as shown in FIG. 10, the second electrode 12 may include a light shielding material 121 and a conductive material 122 located on the light shielding material.

Figure 11A:
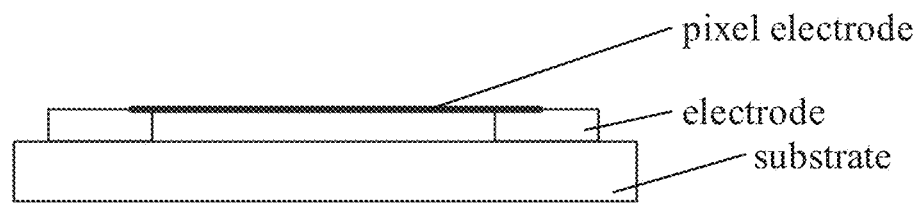
FIGS. 11A and 11B are schematic views of cross sections of the MEMS microswitch when performing a dark state display and a bright state display in accordance with an embodiment of the present disclosure.
Figure 11B:
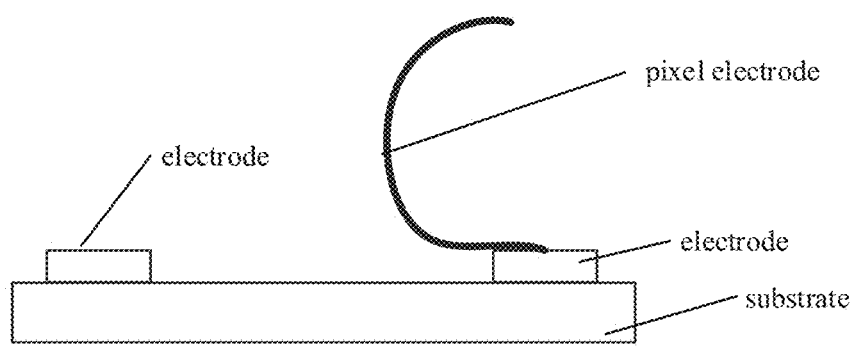

FIGS. 11A and 11B schematically show views of cross sections of a MEMS microswitch in accordance with an embodiment of the present disclosure. As shown in FIG. 11A, the MEMS switch is in a turn-off state, thereby blocking the transmission of light, and thus realizing the dark state display. As shown in FIG. 11B, the MEMS switch is in a turn-on state, thereby allowing the transmission of light, and thus realizing the bright state display of the display panel.

Figure 12:
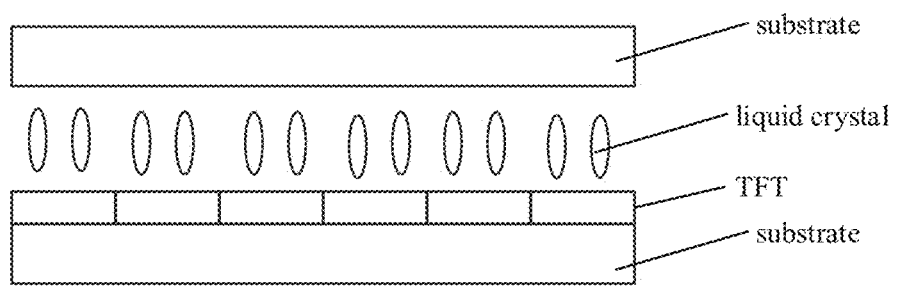
FIG. 12 is a schematic view of a cross section of a liquid crystal window in accordance with an embodiment of the present disclosure.

FIG. 12 schematically shows a cross section of a liquid crystal window in accordance with an embodiment of the present disclosure. When the dark state display is performed, the liquid crystal window is opened, thereby blocking the transmission of light; when the bright state display is performed, the liquid crystal window is closed, thereby allowing the transmission of light.

The foregoing description of the embodiment has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

What is claimed is:

1. A display panel comprising:
    a light switching layer;
    a color film layer located on the light switching layer; and
    a scattering layer, wherein the scattering layer is located one of i) between the light switching layer and the color film layer and ii) on a side of the light switching layer facing away from the color film layer,
    wherein the color film layer comprises a diffraction grating, and a light splitting layer located between the diffraction grating and the light switching layer,
    wherein light transmitted through the diffraction grating is completely separated after passing through the light splitting layer, so as to obtain separated monochromatic lights of different colors.

2. The display panel according to claim 1, wherein the color film layer further comprises a collimating layer located on a side of the diffraction grating facing away from the light switching layer.

3. The display panel according to claim 2, wherein the collimating layer comprises one of a prism structure and a columnar structure.

4. The display panel according to claim 1, wherein the light switching layer comprises one of a particle switch, a MEMS switch, and a liquid crystal window.

5. The display panel according to claim 4, wherein the particle switch comprises:
    a first electrode; and
    a plurality of second electrodes and black charged particles located on a side of the first electrode facing away from the color film layer,
    wherein the second electrode is perpendicular to the first electrode.

6. The display panel according to claim 5, wherein the first electrode continuously covers an entire surface of the color film layer.

7. The display panel according to claim 5, wherein a material of the plurality of second electrodes comprises a reflective conductive material.

8. The display panel according to claim 5, wherein the plurality of second electrodes comprises a light shielding material and a conductive material located on the light shielding material.

9. The display panel according to claim 1, wherein a thickness of the light splitting layer is equal to a light splitting distance.

10. The display panel according to claim 1, wherein the scattering layer comprises a base layer and scattering particles or micropores dispersed in the base layer.

* * * * *